United States Patent
Bae et al.

(10) Patent No.: US 10,027,521 B2
(45) Date of Patent: Jul. 17, 2018

(54) TRANSMITTER, RECEIVER, AND METHODS FOR CONTROLLING THEREOF

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Jae-hyeon Bae, Seoul (KR); Jong-soo Seo, Seoul (KR); Hak-jin Kim, Seoul (KR); Young-ho Oh, Suwon-si (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/728,233

(22) Filed: Jun. 2, 2015

(65) Prior Publication Data
US 2015/0350388 A1 Dec. 3, 2015

(30) Foreign Application Priority Data
Jun. 2, 2014 (KR) .................. 10-2014-0066986

(51) Int. Cl.
*H04L 29/08* (2006.01)
*H04L 27/26* (2006.01)
(Continued)

(52) U.S. Cl.
CPC ...... *H04L 27/2615* (2013.01); *H04L 25/0204* (2013.01); *H04L 25/03343* (2013.01); *H04L 27/2628* (2013.01)

(58) Field of Classification Search
CPC ............. H04L 27/2615; H04L 27/2607; H04L 27/2628
See application file for complete search history.

(56) References Cited

U.S. PATENT DOCUMENTS

2005/0185605 A1 8/2005 Cho et al.
2008/0080628 A1* 4/2008 To .................. H04L 5/0044
375/260
(Continued)

FOREIGN PATENT DOCUMENTS

KR  10-2005-0075242 A   7/2005
KR  10-2008-0104522 A   12/2008
(Continued)

OTHER PUBLICATIONS

Wiegandt et al., High-Throughput, High-Performance OFDM via Pseudo-Orthogonal Carrier Interferometry Spreading Codes, Jul. 2003, IEEE Transactions on Communications, vol. 51, No. 7, pp. 1123-1134.*

(Continued)

*Primary Examiner* — Mohammad Adhami
*Assistant Examiner* — Shailendra Kumar
(74) *Attorney, Agent, or Firm* — Sughrue Mion, PLLC

(57) ABSTRACT

A transmitting apparatus, a receiving apparatus and controlling these apparatuses with regard to antenna identification information are provided. The transmitting apparatus includes: a frame generator configured to generate a plurality of frames which include a preamble symbol and a data symbol; and a transmitter configured to group a plurality of sub-carriers for the plurality of frames into a plurality of groups, insert in the plurality of frames antenna identification information controlling a sum of phase differences between the plurality of groups, calculated based on identification information about at least one external antenna of the transmitting apparatus, to be lowered than a predetermined threshold value, and transmit the plurality of frames in which the antenna identification information is inserted.

20 Claims, 9 Drawing Sheets

(51) Int. Cl.
*H04L 25/02* (2006.01)
*H04L 25/03* (2006.01)

(56) References Cited

U.S. PATENT DOCUMENTS

| | | | | |
|---|---|---|---|---|
| 2008/0316909 A1* | 12/2008 | Yousef | ................ | H04L 27/2075 |
| | | | | 370/208 |
| 2009/0016464 A1* | 1/2009 | Zheng | ................ | H04L 27/2605 |
| | | | | 375/295 |
| 2014/0153507 A1* | 6/2014 | Yang | ................... | H04L 27/2602 |
| | | | | 370/329 |
| 2014/0307609 A1* | 10/2014 | Rudrapatna | .......... | H04B 7/0434 |
| | | | | 370/312 |
| 2015/0139353 A1* | 5/2015 | Baek | ..................... | H04L 5/0007 |
| | | | | 375/295 |
| 2015/0319011 A1* | 11/2015 | Shen | ..................... | H04L 5/0007 |
| | | | | 370/330 |

FOREIGN PATENT DOCUMENTS

| | | |
|---|---|---|
| KR | 10-2009-0110210 A | 10/2009 |
| KR | 10-2012-0090134 A | 8/2012 |

OTHER PUBLICATIONS

Tormos, M., et al., "Experimental performance of mobile DVB-T2 in SFN and distributed MISO Network", 19th International Conference on Telecommunications (ICT 2012), 5 pages total.

* cited by examiner

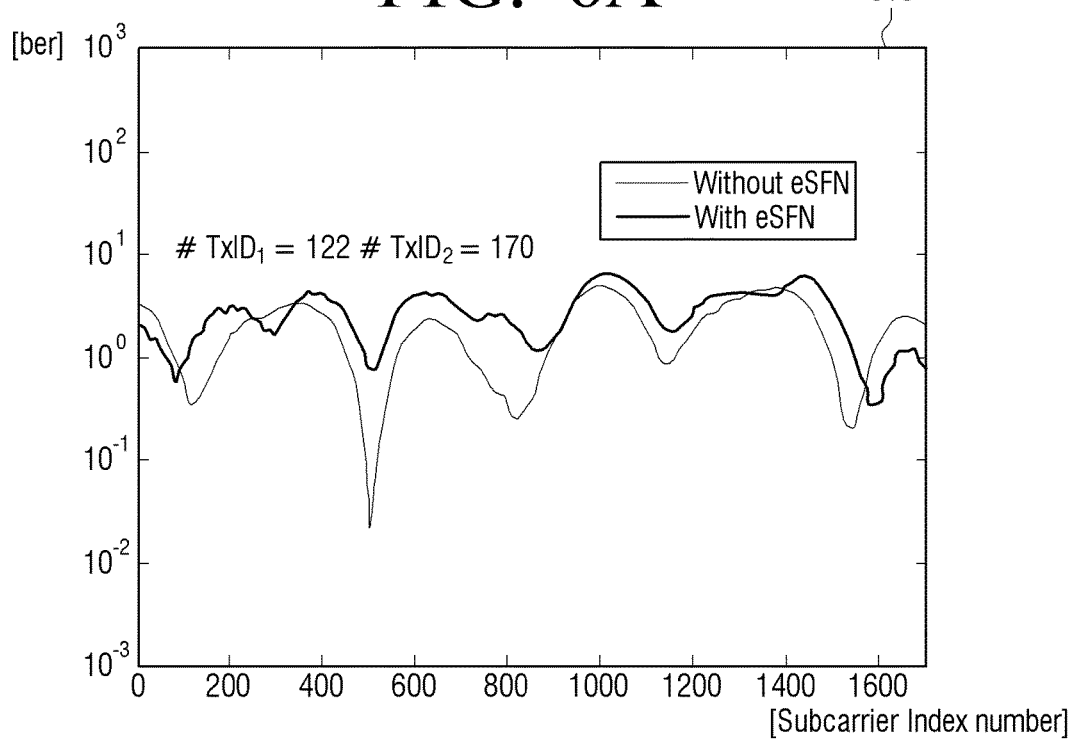
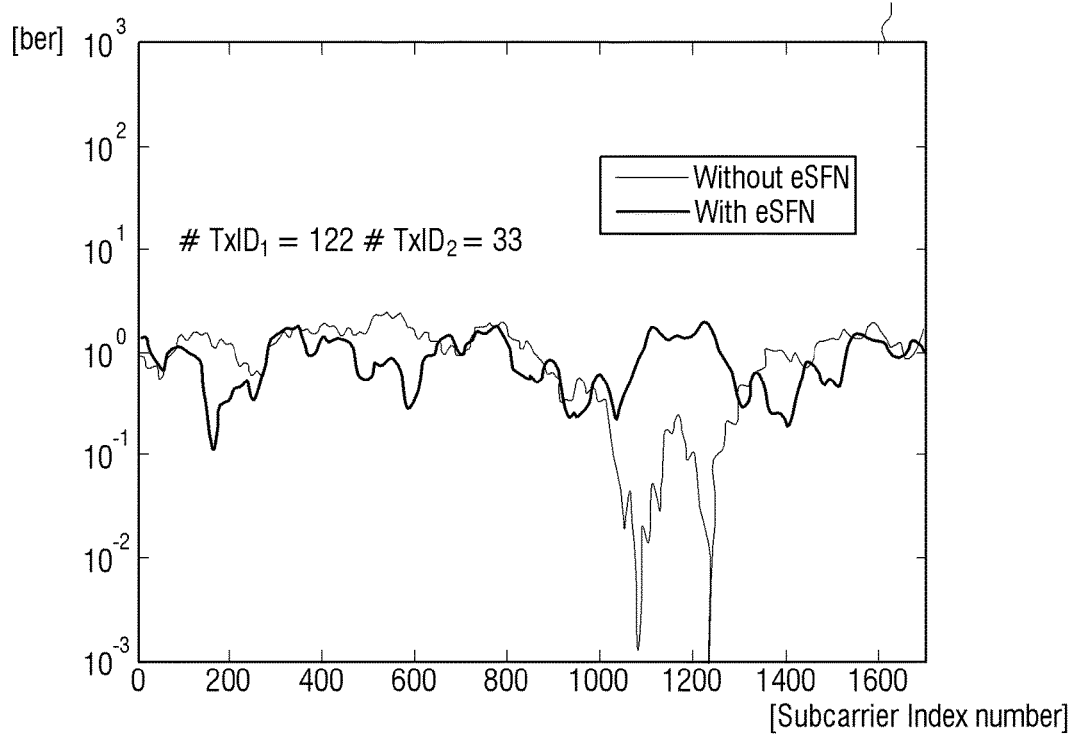

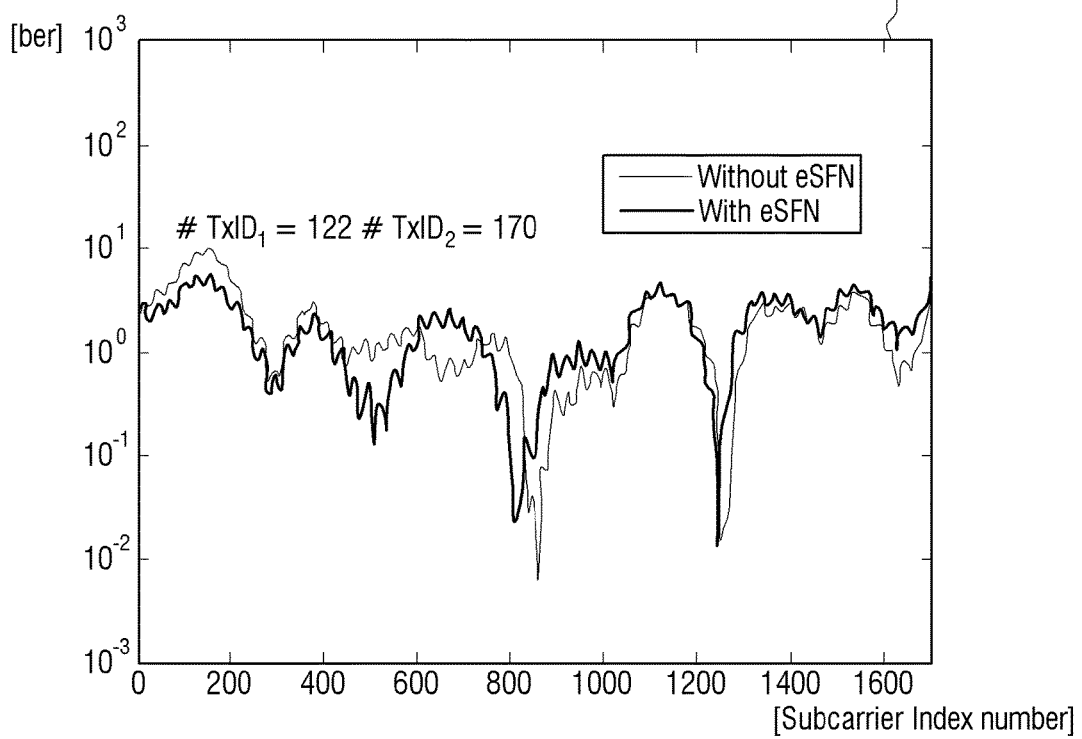
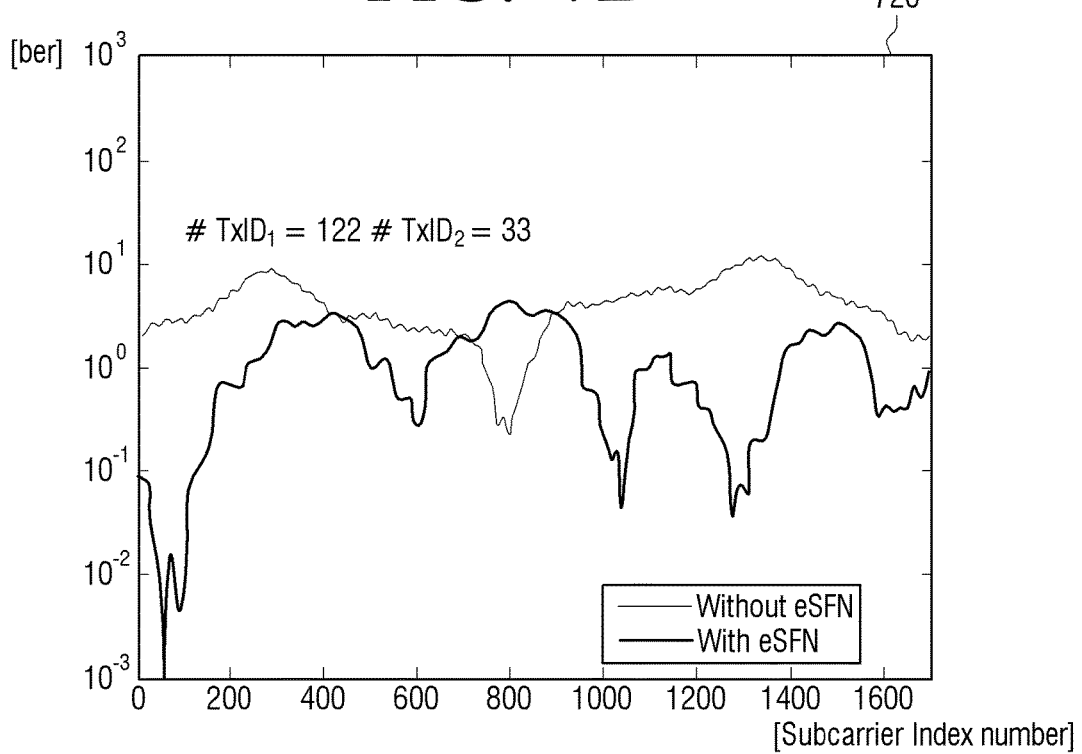

TRANSMITTER, RECEIVER, AND METHODS FOR CONTROLLING THEREOF

CROSS-REFERENCE TO THE RELATED APPLICATIONS

This application claims priority from Korean Patent Application No. 10-2014-0066986, filed on Jun. 2, 2014 in the Korean Intellectual Property Office, the disclosure of which is incorporated herein in its entirety by reference.

BACKGROUND

1. Field

Apparatuses and methods consistent with exemplary embodiments relate to a transmitter, a receiver, and methods for controlling thereof, and more particularly, to a transmitter, a receiver, and the methods for controlling thereof, which uses an Orthogonal Frequency Division Multiplexing (OFDM) method for signal processing.

2. Description of the Related Art

The Digital Video Broadcasting the Second Generation Terrestrial (DVB-T2) refers to a second generation European terrestrial digital broadcast standard of which the performance has been improved from the DVB-T which is adopted as a standard in more than 35 countries in the world including Europe. For the DVB-T2, the transmission capacity and high bandwidth efficiency have been improved by applying the latest technologies such as a Low Density Parity Check (LDPC) code and a 256 QAM modulation method. Accordingly, the DVB-T2 has an advantage of providing various high quality services such as a high definition TV (HDTV), in a limited band.

Meanwhile, the DVB-Next Generation Handheld (NGH) is based on a concept of the DVB-T2, and its specification is an extension of the specification of the DVB-T2. The DVB-NGH defines a next generation transmission system for a broadcasting digital terrestrial and hybrid (a combination of satellite transmission and terrestrial transmission) on a portable terminal device.

The DVB-NGH method employs the OFDM method. In generating OFDM signals, a problem may occur since a single frequency network receives the same signal transmitted from different transmission channels. In order to address such problem, an enhanced Single Frequency Network (eSFN) method is used to distinguish each signal.

The eSFN method is to distinguish channels by giving a phase difference to at least one group or at least one sub-carrier. However, frequent occurrences of the phase difference may result in performance deterioration of a data transmission function.

Accordingly, a necessity of giving a phase difference while maintaining performance has been raised.

SUMMARY

Various exemplary embodiments are provided to address the aforementioned and other problems and disadvantages occurring in the related art.

According to an aspect of an exemplary embodiment, there is provided a transmitting apparatus which may include: a frame generator configured to generate a plurality of frames which include a preamble symbol and a data symbol; and a transmitter configured to group a plurality of sub-carriers for the plurality of frames into a plurality of groups, insert in the plurality of frames antenna identification information controlling a sum of phase differences between the plurality of groups, calculated based on identification information about at least one external antenna of the transmitting apparatus, to be lowered than a predetermined threshold value, and transmit the plurality of frames in which the antenna identification information is inserted.

In this case, the transmitter may include a signal predistortion unit configured to obtain the sum of the phase differences between the plurality of groups, and set the antenna identification information such that the sum of the phase differences is lower than the predetermined threshold value.

In addition, the transmitter may include: an information inserter configured to insert a pilot and a reservation tone in the plurality of frames and provide the signal predistortion unit with the plurality of frame in which the pilot and the reservation tone are inserted; an inverse fast Fourier transform (IFFT) unit configured to IFFT process the plurality of frames provided from the information inserter; a peak to average power ratio (PAPR) reducing unit configured to reduce a PAPR of the IFFT-processed frames; a guard interval (GI) inserter configured to insert a GI into the frames of which the PAPR is reduced; a preamble symbol inserter configured to insert a preamble symbol into the frames in which the GI is inserted; and a digital/analog (D/A) converter configured to convert the frames in which the preamble signal is inserted into an analog signal.

In this case, the antenna identification information may be set for each of the plurality of groups of sub-carriers differently, and may be changed depending upon the number of external antennas of the transmitting apparatus and an FFT size used by the transmitting apparatus.

In addition, the predetermined threshold value may be set to $\pi/2$ in response to the FFT size being 4K.

According to an aspect of another exemplary embodiment, there is provided a receiving apparatus which may include: a receiver configured to receive a plurality of frames in which antenna identification information is inserted; a signal processor configured to determine phase differences between a plurality of groups of sub-carriers for the plurality of frames based on the antenna identification information; and a channel estimator configured to perform channel estimation based on the determined phase differences. Here, the antenna identification information may be set such that a sum of the phase differences, calculated based on identification information about at least one external antenna of a transmitting apparatus transmitting the plurality of frames, is controlled to be lowered than a predetermined threshold value.

The receiving apparatus may include a storage configured to store the antenna identification information. In addition, the signal processor may determine the phase differences based on the stored antenna identification information.

In this case, the antenna identification information may be set for each of the plurality of groups of sub-carriers differently, and may be changed depending upon the number of external antennas of the transmitting apparatus and an FFT size used by the transmitting apparatus.

In addition, the predetermined threshold value may be set to $\pi/2$ in response to the FFT size being 4K.

According to an aspect of still another exemplary embodiment, there is provided a method of controlling a transmitting apparatus. The method may include: generating a plurality of frames which include a preamble symbol and a data symbol; grouping a plurality of sub-carriers for the plurality of frames into a plurality of groups; and inserting in the plurality of frame antenna identification information controlling a sum of phase differences between the plurality of groups, calculated based on identification information about at least one external antenna of the transmitting apparatus, to be lowered than a predetermined threshold value, and transmitting the plurality of frames in which the antenna identification information is inserted.

In this case, the transmitting may include obtaining the sum of the phase differences between the plurality of groups, and setting the antenna identification information such that the sum of the phase differences is lower than the predetermined threshold value.

The transmitting may include: inserting a pilot and a reservation tone in the plurality of frames; IFFT processing the plurality of frames in which the pilot and the reservation tone are inserted; reducing a PAPR of the IFFT processed frames; inserting a GI into the frames of which the PAPR is reduced; inserting a preamble symbol into the frames in which the GI is inserted; and converting the frames in which the preamble signal is inserted into an analog signal.

In addition, the antenna identification information may be set for each of the plurality of groups of sub-carriers differently, and may be changed depending upon the number of external antennas of the transmitting apparatus and an FFT size used by the transmitting apparatus.

The predetermined threshold value may be set to $\pi/2$ in response to the FFT size being 4K.

According to an aspect of still another exemplary embodiment, there is provided a method of controlling a receiving apparatus. The method may include: receiving a plurality of frames in which antenna identification information is inserted; determining phase differences between a plurality of groups of sub-carriers for the plurality of frames based on the antenna identification information; and performing channel estimation based on the determined phase differences. Here, the antenna identification information may be set such that a sum of the phase differences, calculated based on identification information about at least one external antenna of a transmitting apparatus transmitting the plurality of frames, is controlled to be lowered than a predetermined threshold value.

The method may further include determining the phase differences between the plurality of groups based on the stored antenna identification information.

In this case, the antenna identification information may be set for each of the plurality of groups of sub-carriers differently, and may be changed depending upon the number of external antennas of the transmitting apparatus and an FFT size used by the transmitting apparatus.

In addition, the predetermined threshold value may be set to $\pi/2$ in response to the FFT size being 4K.

According to the aforementioned various exemplary embodiments, it is possible to maintain performance while establishing antenna identification information for distinguishing transmission channels.

BRIEF DESCRIPTION OF THE DRAWINGS

The above and/or other aspects of the inventive concept will be more apparent by describing certain exemplary embodiments of the inventive concept with reference to the accompanying drawings, in which:

FIG. 2 is a diagram illustrating external antenna identification information according to an exemplary embodiment;

FIGS. 6A and 6B illustrate results of insertion of antenna identification information according to an exemplary embodiment;

FIGS. 7A and 7B illustrate results of insertion of antenna identification information according to another exemplary embodiment;

DETAILED DESCRIPTION OF THE EXEMPLARY EMBODIMENTS

Figure 1:
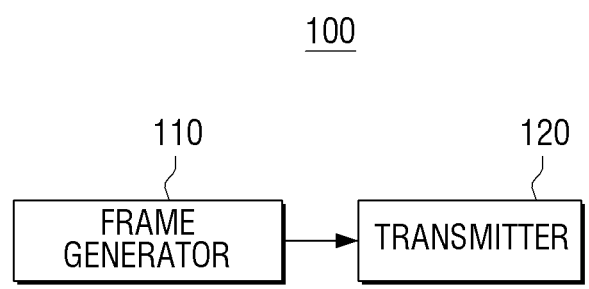
FIG. 1 is a block diagram illustrating a structure of a transmitting apparatus according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, other exemplary embodiments can be practiced without those specifically defined matters. Also, well-known functions or constructions are not described in detail since they would obscure the exemplary embodiments with unnecessary detail.

FIG. 1 is a block diagram illustrating a structure of a transmitting apparatus according to an exemplary embodiment.

According to FIG. 1, a transmitting apparatus 100 includes a frame generator 110 and a transmitter 120.

The frame generator 110 may generate a plurality of frames which include a preamble symbol and at least one data symbol. In this case, the frame generator 110 may be applied before a process of inserting a pilot and a reservation tone among processes of generating an OFDM symbol of the DVB-NGH.

To be specific, the frame generator 110 generates a plurality of frames which include a preamble symbol including information for synchronization and at least one data symbol including data to be transmitted.

The transmitter 120 may group a plurality of sub-carriers corresponding to the plurality of frames into a plurality of groups, insert antenna identification information in the plurality of frames, and transmit the plurality of frames. Here, a sum of phase differences between the plurality of groups of sub-carriers is controlled to be lowered than a predetermined threshold value based on the antenna identification information, at the transmitter 120.

In this case, the transmitter 120 may generate OFDM symbols of the DVB-NGH. For this OFDM symbol generation, the transmitter 120 may perform processes including insertion of a pilot and a reservation tone, inverse fast Fourier transform (IFFT), peak to average power ratio (PAPR) reduction, guard interval (GI) insertion, P1 and P2 symbol insertion, and digital to analog (D/A) conversion. The detailed description thereof will be given below.

The transmitter 120 may calculate a sum of phase differences between a plurality of groups of sub-carriers based on identification information about at least one external antenna. For example, when there are a transmitting tower 1, a transmitting tower 2, and a receiver in a Multiple Input Single Output (MISO) environment, and the transmitting tower 1 and the transmitting tower 2 transmit a same signal to the receiver, the a signal transmitted from the transmitting tower 1 needs to be distinguished from a signal from the transmitting tower 2 since these signals are the same but transmission channels are different. That is, there is a need for antenna identification information for distinguishing whether a signal is transmitted from the transmitting tower 1 or transmitted from the transmitting tower 2. Here, the terms "transmitting tower", "antenna", and "transmitting apparatus" are used for the same apparatus for transmitting a signal.

In addition, the antenna identification information for distinguishing the transmitting tower 1 from the transmitting tower 2 relates to phase differences between a plurality of groups of sub-carriers.

As described above, a method which is applied to distinguishing signals transmitted from a plurality of transmitters in a Single Frequency Network (SFN) environment is called the eSFN.

To be specific, the eSFN uses a Raised Cosine function which is increased to continuously connect segments on adjacent frequency axes. The increased Cosine function is used while being shifted by an integer multiple of a value obtained by dividing an FFT size of an OFDM symbol by 512, that is, the number of sub-carriers constituting a group.

In addition, the eSFN defines a phase of each of the increased Cosine function. A phase value is calculated by Formula 1 as below:

$$\theta(P) = \begin{cases} TX_0 \cdot 2\pi/3 & \text{if } p = 0 \\ \theta(P-1) + TX_P \cdot \pi/4 & \text{else} \end{cases}$$ [Formula 1]

$$TX_p \in \{-1, 0, 1\}, \text{ with } p = 0, \ldots, L$$

In this case, as defined in Formula 1, each transmitting apparatus in a network may be identified according to a value of $TX_P$ having one of values of −1, 0, and 1 and a value of P having one of values 0 to L. Here, L refers to the number of a plurality of groups of sub-carriers and may be a value obtained by dividing the FFT size by 512, that is, the number of sub-carriers constituting a group.

Accordingly, in order to generate a phase difference, the transmitter 120 may divide a plurality of sub-carriers corresponding to a plurality of frames by the number of sub-carriers constituting a group and group the sub-carriers into a plurality of groups.

For example, the antenna identification information for identifying a transmitting apparatus in a 4K OFDM mode may be defined as below. The FFT size is 4K, and the FFT size may be divided by 512 so as to be divided into eight groups. Accordingly, L may be 8. Accordingly, as a value with respect to each group, the antenna identification information may be defined as ($TX_0$, $TX_1$, $TX_2$, $TX_3$, $TX_4$, $TX_5$, $TX_6$, $TX_7$, $TX_8$)=(0, 1, 0, −1, 0, 1, −1, 1, 0). Meanwhile, if only one transmitting apparatus exists in a network, the antenna identification information may be defined as 0. That is, the antenna identification information may be defined as TX=(0, 0, 0, . . . , 0, 0). In this case, TX refers to the antenna identification information.

Accordingly, the transmitter 120 may calculate phase values of the plurality of groups of sub-carriers by substituting TX information into Formula 1.

FIG. 2 is a diagram illustrating antenna identification information according to an exemplary embodiment.

Referring to FIG. 2, $TX_1$ (210) refers to identification information about a first antenna disposed on one of a plurality of transmitters, and $TX_2$ (220) refers to identification information about a second antenna disposed on another transmitting apparatus of the plurality of transmitters.

To be specific, when the FFT size is 8K, the FFT size is divided into 16 groups by being divided by 512, and thus, L becomes 16. Accordingly, the antenna identification information is formed of 17 values from a $0^{th}$ value to a $16^{th}$ value.

Accordingly, as shown in FIG. 2, $TX_1$ (210) which represents the identification information about the first antenna may be represented by a sequence of 17 elements such as [0 0 0 0 0 1 0 0 0 0 0 0 0 0 0 0], $TX_2$ (220) which represents the identification information about the second antenna may be represented by [0 −1 0 0 0 0 1 0 0 0 0 0 0 0 0 0 0].

In this case, in setting identification information about an antenna, a first element is set to a value of 0 and is not set to a value of −1 or 1. An element which belongs to a section which does not relate to data transmission and exceeds $K_{MAX}$ (the maximum value of the number of the usable effective sub-carriers) is set to a value of −1, 0 or 1 randomly, and is not classified. This is because data is not transmitted in a section which exceeds $K_{MAX}$ and does not affect data transmission by being zero-padded.

The element which belongs to a section which does not relate to data transmission and exceeds $K_{MAX}$ may vary depending upon an FFT size. That is, this element does not exist in a 1K mode and a 2K mode, is the last element in a 4K mode, is the second to last element and the first element in a 8K mode, and is the fifth element to last element, the fourth to last element, the third to last element, the second to last element, and the last element in a 16K mode.

For example, in the 4K mode, the last element is an element which belongs to a section which does not relate to data transmission and exceeds $K_{MAX}$, and thus, if each of the antenna identification information is $TX_1$=[TX0, TX1, TX2, TX3, TX4, TX5, TX6, TX7, −1], $TX_2$=[TX0, TX1, TX2, TX3, TX4, TX5, TX6, TX7, 0], and $TX_3$=[TX0, TX1, TX2, TX3, TX4, TX5, TX6, TX7, 1], they are considered as a same sequence regardless of the TX8 values set to −1, 0 or 1, respectively.

Meanwhile, the transmitter 120 may generate phase values of the plurality of groups corresponding to $TX_1$(210) and phase values of the plurality of groups corresponding to $TX_2$ (220) by substituting the external antenna identification information ($TX_1$(210) and $TX_2$(220)) into Formula 1.

In addition, the transmitter 120 may generate antenna identification information which controls a sum of differences between the phase values of plurality of groups corresponding to $TX_1$(210) to be lower than a predetermined threshold value, and also controls a sum of differences between the phase values of plurality of groups corresponding to $TX_2$ (220) to be lower than the predetermined threshold value.

Meanwhile, in the aforementioned example, a sum of differences between the phase values of plurality of groups corresponding to $TX_1$(210) and the phase values of plurality of groups corresponding to $TX_2$ (220) should be lower than the predetermined threshold value.

Consequently, in a MISO environment where a plurality of transmitting apparatuses and one receiving apparatus exist, that is, transmission areas of the plurality of transmitting apparatuses are overlapped, the sum of the differences of the phase values of the plurality of groups corresponding to the antenna identification information of the plurality of transmitting apparatuses should be lower than the predetermined threshold value.

In the above descriptions, an operation of generating the antenna identification information which controls the sum of the phase differences between the plurality of groups of sub-carriers, calculated based on identification information about at least one external antenna, to be lower than a predetermined threshold, is performed at the transmitter 120, but to be specific, this operation may be performed at a signal predistortion unit.

That is, the transmitting apparatus may include a signal predistortion unit 122 which generates antennal identification information which controls a sum of phase differences between a plurality of groups of sub-carriers, calculated based on identification information about at least one external antenna, to be lower than the predetermined value. This operation will be described in detail with reference to FIG. 3.

Figure 3:
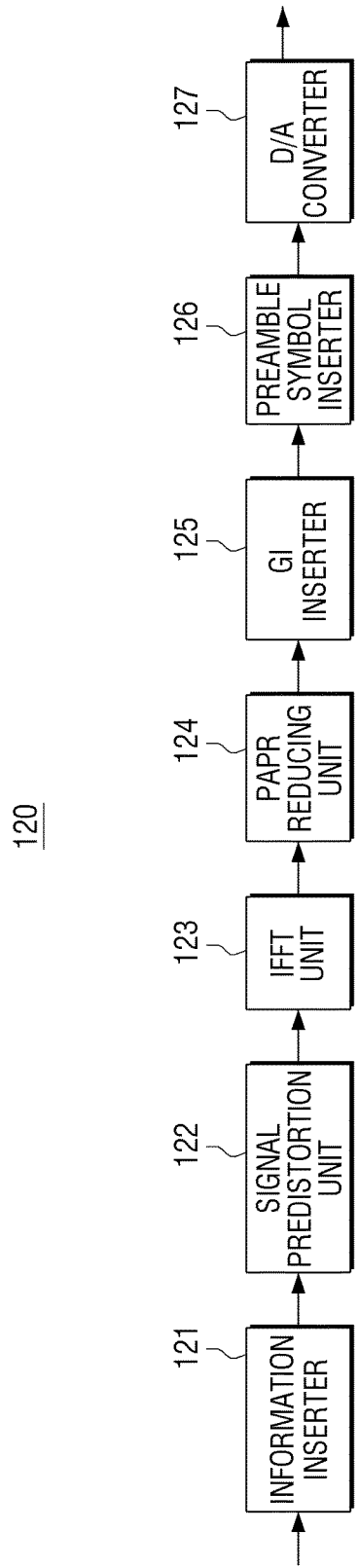
FIG. 3 is a block diagram illustrating a specific structure of a transmitting unit according to an exemplary embodiment.

FIG. 3 is a block diagram illustrating a specific structure of a transmitter according to an exemplary embodiment.

Referring to FIG. 3, the transmitter 120 includes information inserter 121, the signal predistortion unit 122, an IFFT unit 123, a PAPR reducing unit 124, a GI inserter 125, a preamble symbol inserter 126, and a D/A converter 127.

To be specific, the information inserter 121 inserts a pilot and a reservation tone into a plurality of frames and provides the signal predistortion unit 122 with the plurality of frames including the pilot and the reservation tone. For example, input signals of N-L number of bits and L number of reservation tones may be input at the information inserter 121. In addition, 0 is inserted into each of the reservation tones without data.

The signal predistortion unit 12 groups a plurality of sub-carriers, corresponding to a plurality of frames in which the pilot and the reservation tone are inserted, into a plurality of groups of sub-carriers, and generates antenna identification information such that a sum of phase differences between the plurality of groups of sub-carriers calculated based on at least one external antenna identification information is lower than a predetermined threshold value.

The IFFT unit 123 IFFT processes the plurality of frames in which the antenna identification information is inserted.

The PAPR reducing unit 124 reduces a PAPR of a signal output from the IFFT unit 123. In this case, the PAPR reducing unit 124 may include a gradient algorithm unit (not shown) and may add a signal generated by the gradient algorithm unit to an output signal from the IFFT unit 123 to generate an output signal of the PAPR reducing unit 124. In this case, the gradient algorithm unit may reduce a PAPR of the output signal from the IFFT unit 123 by using an impulse signal corresponding to the reservation tone.

The GI inserter 125 inserts a GI into the signal output from the PAPR reducing unit 124. In this case, the GI refers to a section which is inserted to prevent interference between adjacent signals. The preamble symbol inserter 126 inserts a preamble symbol into the signal output from the GI inserter 125.

The D/A converter 127 performs an up-conversion operation which converts a signal to which the preamble symbol is inserted to an analog signal and transmits the converted signal.

Meanwhile, the antenna identification information may be set differently depending upon the number of external antennas and the FFT size. The sum of the phase differences between the plurality of groups, each of which corresponds to each external antenna identification information, should be lower than the predetermined threshold value according to the number of the external antennas, and thus, if the number of the external antennas is changed, the antenna identification information to be set should be changed in order to satisfy the aforementioned condition. In addition, if the FFT size is changed, the number of groups of which phases are different also changes, and thus, a length of a sequence constituting the antenna identification information is changed.

In case of the FFT size being 4K, the predetermined threshold value is $\pi/2$ according to an exemplary embodiment.

That is, if the FFT size is 4K and the sum of the phase differences between the plurality of groups of sub-carriers calculated based on at least one external antenna identification information exceeds $\pi/2$, the data transmission performance of the transmitter 120 may be deteriorated. Accordingly, in case of the FFT size being 4K, the transmitter 120, in particular, the signal predistortion unit 122 should set the antenna identification information based on the at least one external antenna identification information such that the sum of the phase differences between the plurality of groups becomes lower than $\pi/2$.

Figure 4:
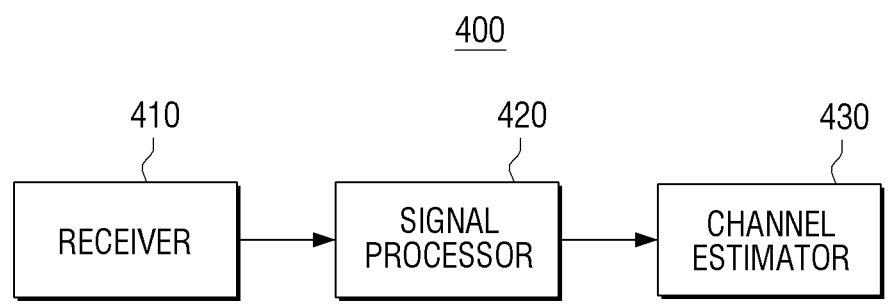
FIG. 4 is a block diagram illustrating a structure of a receiver according to an exemplary embodiment.

FIG. 4 is a block diagram illustrating a structure of a receiving apparatus according to an exemplary embodiment.

Referring to FIG. 4, a receiving apparatus 400 includes a receiver 410, a signal processor 420, and a channel estimator 430.

The receiver 410 receives a plurality of frames to which antenna identification information is inserted.

The signal processor 420 may extract the antenna identification information inserted into the plurality of frames and determine phase differences regarding the plurality of frames based on the extracted antenna identification information.

That is, the signal processor 420 may determine the phase differences between a plurality of groups of sub-carriers based on information about phase values applied to the plurality of groups each of which is formed of at least one sub-carrier and which are included in each of the plurality of frames.

The channel estimating unit 430 may perform channel estimation based on the determined phase differences.

To be specific, the channel estimating unit 430 may determine a phase value of each group of sub-carriers based on the determined phase differences, determine a transmission channel according to the phase values, and perform the channel estimation with respect to each transmission channel.

In this case, the antenna identification information is set such that a sum of the phase differences between the plurality of groups, where a plurality of sub-carriers corresponding to each of a plurality of frames are grouped, calculated based on at least one external antenna identification information is lower than the predetermined threshold value. The process of setting the antenna identification information was described above, and thus, the detailed description will be omitted.

Figure 5:
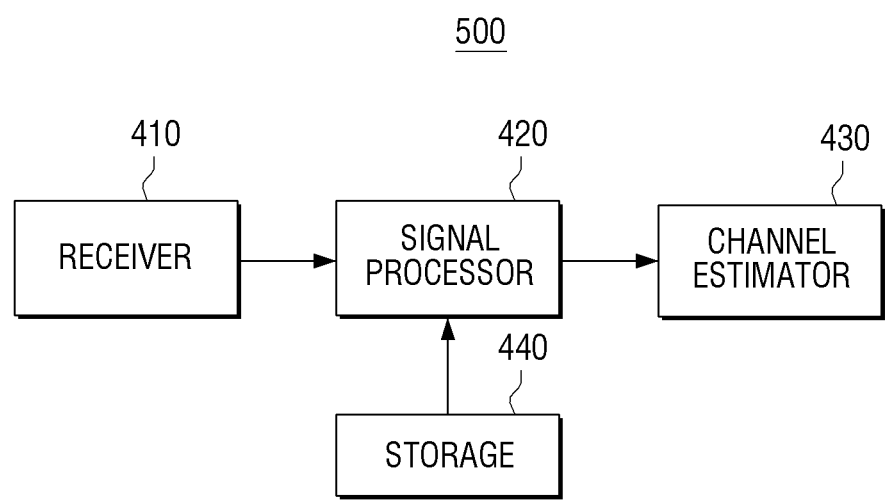
FIG. 5 is a block diagram illustrating a receiver according to another exemplary embodiment.

FIG. 5 is a block diagram illustrating a receiving apparatus according to another exemplary embodiment.

Referring to FIG. 5, a receiving apparatus 500 includes a receiver 410, a signal processor 420, a channel estimating unit 430, and storage 440.

The receiver 410, the signal processor 420, and the channel estimating unit 430 were described above, and thus, the detailed description will be omitted.

The receiving apparatus 500 according to an exemplary embodiment may further include the storage 440. The storage 440 stores antenna identification information.

The signal processor 420 may determine phase differences between a plurality of groups of sub-carriers based on the antenna identification information stored in the storage 440.

That is, the receiving apparatus 500 may receive a plurality of frames to in each of which the antenna identification information is inserted and extract and use the antenna identification information inserted in each of the plurality of frames. However, in a state where the antenna identification information is stored in the storage 440, the signal processor 420 may process a signal by using the pre-stored antenna identification information.

In addition, the storage 440 may update newly generated antenna identification information continuously.

Meanwhile, the antenna identification information may be set differently depending upon the number of external antennas and the FFT size. The sum of the phase differences between the plurality of groups, each of which corresponds each antenna identification information, should be lower than the predetermined threshold value according to the number of the external antennas, and thus, if the number of the external antennas is changed, the antenna identification information to be set should be changed in order to satisfy the aforementioned condition. In addition, if the FFT size is changed, the number of groups of which phases are different also changes, and thus, a length of a sequence constituting the antenna identification information is changed.

In case of the FFT size being 4K, the predetermined threshold value is $\pi/2$ according to an exemplary embodiment. That is, if the FFT size is 4K and the sum of the phase differences between the plurality of groups of sub-carriers calculated based on at least one external antenna identification information exceeds $\pi/2$, the data transmission performance of the transmitter 120 may be deteriorated. Accordingly, in case of the FFT size being 4K, the antenna identification information should be set such that the sum of the phase differences of the plurality of groups is lower than $\pi/2$ based on at least one external antenna identification information.

FIGS. 6A and 6B illustrate results of insertion of antenna identification information according to an exemplary embodiment.

In FIG. 6A, a graph 610 illustrates a signal wave of an indirect wave to which antenna identification information controlling the sum of the phase differences between the plurality of groups calculated based on the external antenna identification information to be lower than a predetermined threshold value (with eSFN), and a signal wave where an eSFN method is not applied. In FIG. 6B, a graph 620 illustrates a signal wave of an indirect wave to which antenna identification information which does not control the sum of the phase differences between the plurality of groups calculated based on the external antenna identification information to be lower than the predetermined threshold value (with eSFN) and a signal wave of an indirect wave where an eSFN method is not applied.

Referring to the graph 610 of FIG. 6A, the phase differences are applied, but a signal strength of the signal wave of the indirect wave to which the antenna identification information which satisfies the condition that the sum of the phase differences between the plurality of groups calculated based on the external antenna identification information is lower than the predetermined threshold value is stronger than a signal strength of the signal wave of the indirect wave where the phase differences are not applied and the performance was not deteriorated relatively.

However, referring to the graph 620 of FIG. 6B, as the phase differences are applied, a signal strength of the signal wave of the indirect wave to which the antenna identification information which does not satisfy the condition that the sum of the phase differences between the plurality of groups calculated based on the external antenna identification information is lower than the predetermined threshold value is weaker than a signal strength of the signal wave where the phase differences are not applied and the performance was deteriorated relatively.

FIGS. 7A and 7B illustrate results of insertion of antenna identification information according to another exemplary embodiment.

In FIG. 7A a graph 710 illustrates a signal wave of a direct wave to which antenna identification information controlling the sum of the phase differences between the plurality of groups calculated based on the external antenna identification information to be lower than a predetermined threshold value (with eSFN), and a signal wave of a direct wave to which an eSFN method is not applied. In FIG. 7B, a graph 720 illustrates a signal wave of a direct wave to which antenna identification information which does not control the sum of the phase differences between the plurality of groups calculated based on the external antenna identification information to be lower than the predetermined threshold value (with eSFN) and a signal wave of a direct wave where an eSFN method is not applied.

Referring to the graph 710 of FIG. 7A, the phase differences are applied, but a signal strength of the signal wave of the direct wave to which the antenna identification information which satisfies the condition that the sum of the phase differences between the plurality of groups calculated based on the external antenna identification information is lower than the predetermined threshold value is stronger than a signal strength of the signal wave of the direct wave where the phase differences are not applied and the performance was not deteriorated relatively.

However, referring to the graph 720 of FIG. 7B, as the phase differences are applied, a signal strength of the signal wave of the direct wave to which the antenna identification information which does not satisfy the condition that the sum of the phase differences between the plurality of groups calculated based on the external antenna identification information is lower than the predetermined threshold value is weaker than a signal strength of the signal wave of the direct wave where the phase differences are not applied and the performance was deteriorated relatively.

Figure 8:
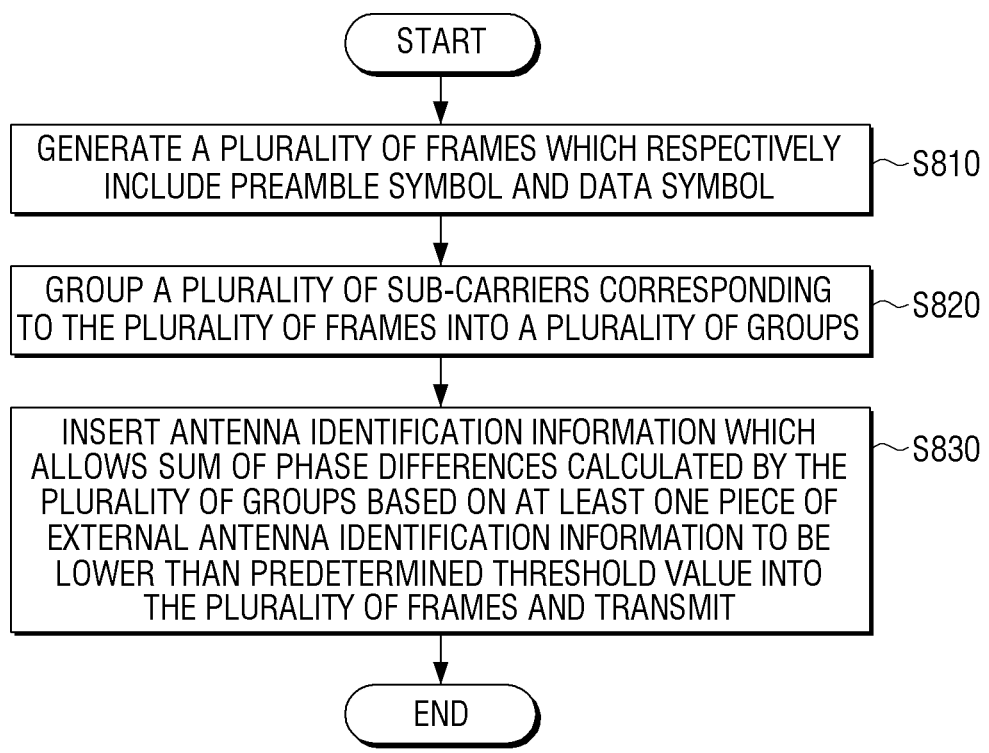
FIG. 8 is a flow chart provided to describe a method of controlling a transmitting apparatus according to an exemplary embodiment.

FIG. 8 is a flow chart provided to describe a method of controlling a transmitting apparatus according to an exemplary embodiment.

Referring to FIG. 8, a plurality of frames which respectively includes a preamble symbol and a data symbol are generated (S810).

In addition, a plurality of sub-carriers corresponding to each of the plurality of frames are grouped into a plurality of groups (S820).

Subsequently, antenna identification information which controls a sum of phase differences between the plurality of groups calculated based on identification information about at least one external antenna to be lower than a predetermined threshold value is inserted into each of the plurality of frames, and the plurality of frames are transmitted (S830).

In this case, the transmitting operation may include obtaining a sum of the phase differences between the plurality of groups calculated based on the at least external antenna identification information and setting the antenna identification information controlling the sum of the phase differences to be lower than the predetermined threshold value.

In addition, the transmitting operation may include inserting a pilot and a reservation tone into the plurality of frames, inserting the antenna identification information into the plurality of frames, IFFT processing the plurality of frames, reducing a PAPR of the IFFT processed signal, inserting a GI into the signal of which a PAPR is reduced, inserting a preamble symbol into the signal to which the GI is inserted, and converting the signal to which the preamble signal is inserted into an analog signal.

In this case, the antenna identification information may be set differently depending upon the number of the external antennas and the FFT size.

In addition, in case of the FFT size being 4K, the predetermined threshold value is $\pi/2$.

Figure 9:
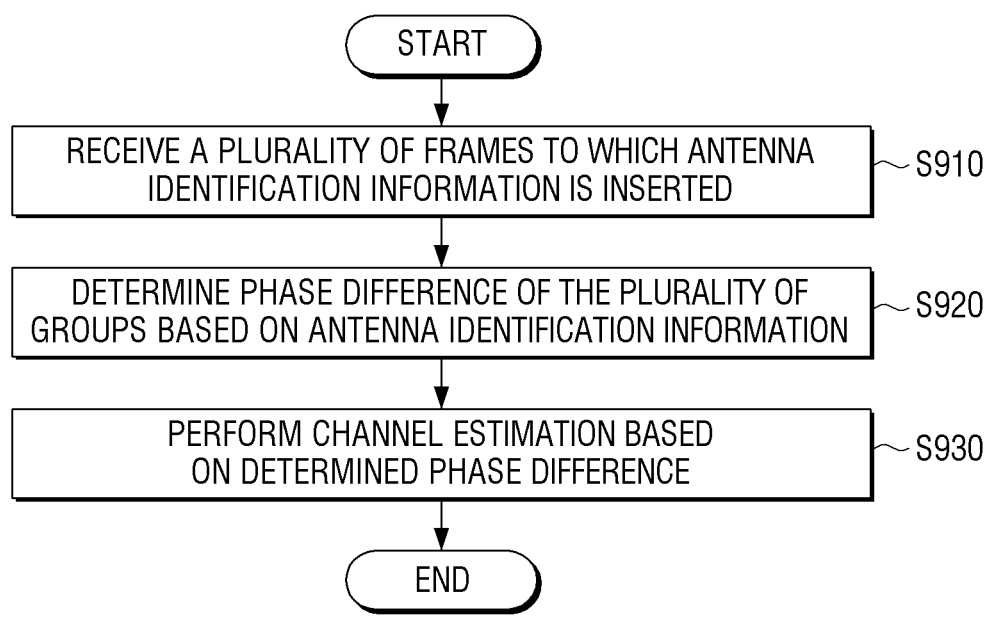
FIG. 9 is a flow chart provided to describe a method of controlling a receiver according to an exemplary embodiment.

FIG. 9 is a flow chart provided to describe a method of controlling a receiving apparatus according to an exemplary embodiment.

According to the method of FIG. 9, a plurality of frames to which antenna identification information is inserted are received (S910).

Phase differences between a plurality of groups of sub-carriers are determined based on the antenna identification information (S920).

Subsequently, channel estimation is performed based on the determined phase differences (S930).

In this case, the antenna identification information is set such that a sum of the phase differences between the plurality of groups of sub-carriers corresponding to each of the plurality of frames is lower than a predetermined threshold value, based on identification information about at least one external antenna.

In addition, the method of FIG. 9 further includes determining phase differences between the plurality of groups based on the pre-stored antenna identification information.

In this case, the antenna identification information may be set differently depending upon the number of the external antennas and the FFT size.

In addition, in case of the FFT size being 4K, the predetermined threshold value is $\pi/2$.

Meanwhile, a non-transitory computer readable medium including a program for sequentially executing the above-described controlling methods according to an exemplary embodiment may be provided.

As an example, a non-transitory computer readable medium including a program for executing operations of generating a plurality of frames which respectively include a preamble symbol and a data symbol, grouping a plurality of sub-carriers corresponding to each of the plurality of frames into a plurality of groups, and inserting and transmitting antenna identification information which controls a sum of phase differences between the plurality of groups calculated based on at least one external antenna identification information to be lower than a predetermined threshold value may be provided.

As another example, a non-transitory computer readable medium including a program for executing operations of determining phase differences between the plurality of groups based on antenna identification information and performing channel estimation based on the determined phase differences may be provided.

The non-transitory computer readable medium refers to a medium which may store data semi-permanently rather than storing data for a short time such as a register, a cache, and a memory and may be readable by an apparatus. Specifically, the above-described various applications and programs may be stored in the non-transitory computer readable r medium like a compact disc (CD), a digital versatile disk (DVD), a hard disk, a Blu-ray disk, a universal serial bus (USB), a memory card, and a read-only memory (ROM), etc., and provided therein.

At least one of the components, elements or units represented by a block as illustrated in FIGS. 1 and 3-5 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus.

As given above, although a few exemplary embodiments have been shown and described, the inventive concept is not limited to the aforementioned exemplary embodiments, and could be variously modified and achieved by those skilled in the art to which the inventive concept pertains without deviating from the substance of the inventive concept which is claimed in the claims, and such modifications should not be understood separately from the inventive concept.

What is claimed is:

1. A transmitting apparatus comprising at least one processor to implement:
    a frame generator configured to generate a first frame and a second frame; and
    a transmitter configured to:
        calculate first phases for sub-carrier groups of the first frame based on a first sequence;
        apply the first phases to the sub-carrier groups of the first frame;
        calculate second phases for sub-carrier groups of the second frame based on a second sequence;
        apply the second phases to the sub-carrier groups of the second frame;
        transmit, using a first antenna, the first frame to which first identification information is inserted; and
        transmit, using a second antenna, the second frame to which second identification information is inserted,
    wherein the transmitter is further configured to:
        if a sum of differences between the first phases and the second phases is equal to or less than a predetermined threshold value, use the first sequence and the second sequence as the first identification information and the second identification information, respectively, and
        if the sum of differences between the first phases and the second phases is greater than the predetermined threshold value, change at least one of the first sequence and the second sequence to reduce the sum of differences between the first phases and the second phases.

2. The transmitting apparatus of claim 1, wherein the transmitter comprises a signal predistortion unit configured to obtain the sum of the differences, and set the first identification information such that the sum of the differences is lower than the predetermined threshold value.

3. The transmitting apparatus of claim 2, wherein the transmitter comprises:
   an information inserter configured to insert a pilot and a reservation tone in the first frame generated by the frame generator, and provide the signal predistortion unit with the first frame in which the pilot and the reservation tone are inserted;
   an inverse fast Fourier transform (IFFT) unit configured to IFFT process the first frame provided from the information inserter;
   a peak to average power ratio (PAPR) reducing unit configured to reduce a PAPR of the IFFT-processed first frame;
   a guard interval (GI) inserter configured to insert a GI into the first frame of which the PAPR is reduced;
   a preamble symbol inserter configured to insert a preamble symbol into the first frame in which the GI is inserted; and
   a digital/analog (D/A) converter configured to convert the first frame in which the preamble symbol is inserted into an analog signal.

4. The transmitting apparatus of claim 1, wherein the first identification information is set for each of the sub-carrier groups of the first frame differently.

5. The transmitting apparatus of claim 4, wherein the first identification information is changed depending upon the number of the second antenna and a fast Fourier transform (FFT) size used by the first antenna.

6. The transmitting apparatus of claim 1, wherein the predetermined threshold value is set to $\pi/2$ in response to a fast Fourier transform (FFT) size being 4K.

7. A receiving apparatus comprising:
   a receiver configured to receive a first frame in which first identification information of a first antenna is inserted, and a second frame in which second identification information of a second antenna is inserted, from a transmitting apparatus; and
   a signal processor configured to determine differences between phases for sub-carrier groups of the first frame and phases for sub-carrier groups of the second frame, and estimate a first channel between the first antenna and the receiving apparatus and a second channel between the second antenna and the receiving apparatus, based on the determined differences,
   wherein the transmitting apparatus is configured to calculate first phases and second phases based on a first sequence and a second sequence, respectively, apply the first phases and the second phases to the sub-carrier groups of the first frame, respectively, and transmit the first frame, to which the first identification information is inserted, and the second frame to which the second identification information is inserted, using the first antenna and the second antenna, respectively, and
   wherein if a sum of differences between the first phases and the second phases is equal to or less than a predetermined threshold value, the first sequence and the second sequence are used as the first identification information and the second identification information, and if the sum of differences between the first phases and the second phases is greater than the predetermined threshold value, at least one of the first sequence and the sequence is changed to reduce the sum of differences between the first phases and the second phases.

8. The receiving apparatus of claim 7 further comprising a storage configured to store the first identification information,
   wherein the signal processor determines the differences between the first phases and the second phases based on the stored first identification information.

9. The receiving apparatus of claim 7, wherein the first identification information is set for each of the sub-carrier groups of the first frame differently.

10. The receiving apparatus of claim 9, wherein the first identification information is changed depending upon the number of the second antenna and a fast Fourier transform (FFT) size used by the first antenna.

11. The receiving apparatus of claim 7, wherein the predetermined threshold value is set to $\pi/2$ in response to a fast Fourier transform (FFT) size being 4K.

12. A method of controlling a transmitting apparatus, the method comprising:
    generating a first frame and a second frame;
    calculating first phases for sub-carrier groups of the first frame based on a first sequence and second phases for sub-carrier groups of the second frame based on a second sequence; applying the first phases and the second phases to the sub-carrier groups of the first frame and the sub-carrier groups of the second frame, respectively; and
    transmitting the first frame, to which first identification information is inserted, and the second frame to which second identification information is inserted, using a first antenna and a second antenna, respectively,
    wherein if a sum of differences between the first phases and the second phases is equal to or less than a predetermined threshold value, the first sequence and the second sequence are used as the first identification information and the second identification information, respectively, and
    wherein if the sum of differences between the first phases and the second phases is greater than the predetermined threshold value, at least one of the first sequence and the second sequence is changed to reduce the sum of differences between the first phases and the second phases.

13. The method of claim 12, wherein the transmitting comprises obtaining the sum of the differences, and setting the first identification information such that the sum of the differences is lower than the predetermined threshold value.

14. The method of claim 12, wherein the transmitting comprises:
    inserting a pilot and a reservation tone in the first frame generated by the first antenna;
    inverse fast Fourier transform (IFFT) processing the first frame in which the pilot and the reservation tone are inserted;
    reducing a peak to average power ratio (PAPR) of the IFFT processed first frame;
    inserting a guard interval (GI) into the first frame of which the PAPR is reduced;
    inserting a preamble symbol into the first frame in which the GI is inserted; and
    converting the first frame in which the preamble symbol is inserted into an analog signal.

15. The method of claim 12, wherein the first identification information is set for each of the sub-carrier groups of the first frame differently.

16. The method of claim 15, wherein the first identification information is changed depending upon the number of the second antenna and a fast Fourier transform (FFT) size used by the first antenna.

17. The method of claim 12, wherein the predetermined threshold value is set to $\pi/2$ in response to a fast Fourier transform (FFT) size being 4K.

18. A method of controlling a receiving apparatus, the method comprising:
- receiving a first frame in which first identification information of a first antenna is inserted, and a second frame in which second identification information of a second antenna is inserted, from a transmitting apparatus;
- determining differences between phases for sub-carrier groups of the first frame and phases for sub-carrier groups of the second frame; and
- estimating a first channel between the first antenna and the receiving apparatus and a second channel between the second antenna and the receiving apparatus, based on the determined differences,
- wherein the transmitting apparatus is configured to calculate first phases and second phases based on a first sequence and a second sequence, respectively, apply the first phases and the second phases to the sub-carrier groups of the first frame, respectively, and transmit the first frame, to which first identification information is inserted, and the second frame to which second identification information is inserted, using the first antenna and the second antenna, respectively,
- wherein the if a sum of differences between the first phases and the second phases is equal to or less than a predetermined threshold value, the first sequence and the second sequence are used as the first identification information and the second identification information, and
- if the sum of differences between the first phases and the second phases is greater than the predetermined threshold value, at least one of the first sequence and the second sequence is changed to reduce the sum of differences between the first phases and the second phases.

19. The method of claim 18, wherein the first identification information is set for each of the sub-carrier groups of the first frame differently.

20. The method of claim 19, wherein the first identification information is changed depending upon the number of the second antenna and a fast Fourier transform (FFT) size used by the first antenna.

* * * * *